United States Patent

Schwarz

[11] Patent Number: 5,649,360
[45] Date of Patent: Jul. 22, 1997

[54] METHOD OF MAKING A VENT VALVE

[75] Inventor: Wilhelm Schwarz, Marbach, Germany

[73] Assignee: Behr-Thomson GmbH & Co., Germany

[21] Appl. No.: 460,997

[22] Filed: Jun. 5, 1995

Related U.S. Application Data

[62] Division of Ser. No. 261,980, Jun. 17, 1994, abandoned.

[30] Foreign Application Priority Data

Jun. 18, 1994 [DE] Germany ............................ 9309104 U

[51] Int. Cl.⁶ .................................................. B23P 15/00
[52] U.S. Cl. ................................... 29/890.13; 29/890.122
[58] Field of Search ................. 29/890.122, 890.126, 29/890.128, 890.13; 137/538, 539, 533.11, 533.19

[56] References Cited

U.S. PATENT DOCUMENTS

| | | | |
|---|---|---|---|
| 1,189,814 | 7/1916 | Hayes | 137/533.11 |
| 2,723,679 | 11/1955 | Harris et al. | 137/533.19 |
| 3,174,437 | 3/1965 | Stree | 137/533.11 |
| 3,504,701 | 4/1970 | Gross | 29/890.13 |
| 3,725,990 | 4/1973 | Petersen et al. | 29/890.13 |
| 3,916,496 | 11/1975 | Freiheit | 29/890.13 |
| 4,059,881 | 11/1977 | Sliger | 29/890.122 |
| 4,756,335 | 7/1988 | Kim | 137/533.11 |
| 4,896,409 | 1/1990 | Rösch et al. | 29/890.128 |
| 5,095,940 | 3/1992 | Saur | 137/533.11 |

FOREIGN PATENT DOCUMENTS 0131481  8/1983  Japan .............................. 29/890.128

*Primary Examiner*—Irene Cuda
*Attorney, Agent, or Firm*—Evenson, McKeown, Edwards & Lenahan, P.L.L.C.

[57] ABSTRACT

A vent valve for a thermostatic valve of a coolant circuit of an internal combustion engine has a ball with a radius and a diameter and serving as a sealing element, and a one-piece metal cage for the ball. The cage has a pot-shaped part with an inside diameter larger than the diameter of the ball, and a bottom having a valve opening surrounded by an outwardly projecting neck. The cage is shaped in one piece from an originally flat metal sheet by stamping, deep-drawing, and pressing, and the pot-shaped part has a height approximately the radius of the ball, and an edge abutted by a plurality of uniformly distributed tabs located on an axial extension of the pot-shaped part, the tabs having inwardly bent ends to retain the ball in the cage with play, the length of the tabs being greater than or equal to the height of the pot-shaped part.

1 Claim, 1 Drawing Sheet

5,649,360

METHOD OF MAKING A VENT VALVE

This is a divisional application of application Ser. No. 08/261,980, filed Jun. 17, 1994, abandoned.

BACKGROUND AND SUMMARY OF THE INVENTION

The present invention relates to a vent valve for a thermostatic valve of a coolant circuit of an internal combustion engine, with a cage made of one piece of metal, and a ball serving as the sealing element. The cage has a pot-shaped part with an inside diameter larger than the diameter of the ball. The bottom of the part is provided with a vent opening surrounded by an outwardly projecting neck, whose edge is abutted by retaining means retaining the ball with play.

U.S. Pat. No. 4,059,881 shows a vent valve of the above-described general type in which the pot-shaped fitting has a height roughly corresponding to the diameter of the ball. The edge of the pot-shaped insert whose inside diameter is approximately twice the diameter of the ball is abutted by an initially axially directed tab which is later bent inward at a distance from the bottom of the pot-shaped part which roughly corresponds to one and one-half times the diameter of the ball. It is not disclosed in U.S. Pat. No. 4,059,881 how the cage is made. However it can be assumed that the cage is made from a section of tubing constructed in the vicinity of the neck or expanded in the area of the pot-shaped part.

It is also known from German Patent DE 81 02 817.2 U1 that a one-piece cage can be manufactured by machining. The pot-shaped part of this cage has a height which is more than twice the diameter of the ball. After the ball is inserted, the edge of the pot-shaped part is pressed inward so that an opening remains whose diameter is less than the diameter of the ball. In addition, the cylindrical walls of the pot-shaped part are provided with transverse bores.

Vent valves of the initially described general type are used in large numbers. An object of the present invention is to provide a vent valve of the general type whose manufacture allows mass production at low cost.

This and other objects are achieved by the present invention by making the cage in one piece from an originally flat metal sheet by stamping, deep-drawing, and pressing, with a pot-shaped part with a height roughly corresponding to the radius of the ball, and with an edge abutted by a plurality of tabs uniformly distributed in the axial direction of the pot-shaped part and provided with inwardly bent ends, the length of which corresponds at least to the height of the pot-shaped part.

The tabs which are later bent and raised make it possible to hold the cage securely in tools during manufacture of the pot-shaped part and the neck so that the entire cage can be manufactured in simple fashion by stamping, deep-drawing, and pressing.

In certain embodiments of the invention, the transition between the bottom of the pot-shaped part and the neck is in the form of a frustroconical valve surface. This valve surface, which ensures the necessary tightness, can be produced in simple fashion by a pressing process, this process being combined with another work step.

Other objects, advantages and novel features of the present invention will become apparent from the following detailed description of the invention when considered in conjunction with the accompanying drawings.

DETAILED DESCRIPTION OF THE DRAWINGS

Figure 1:
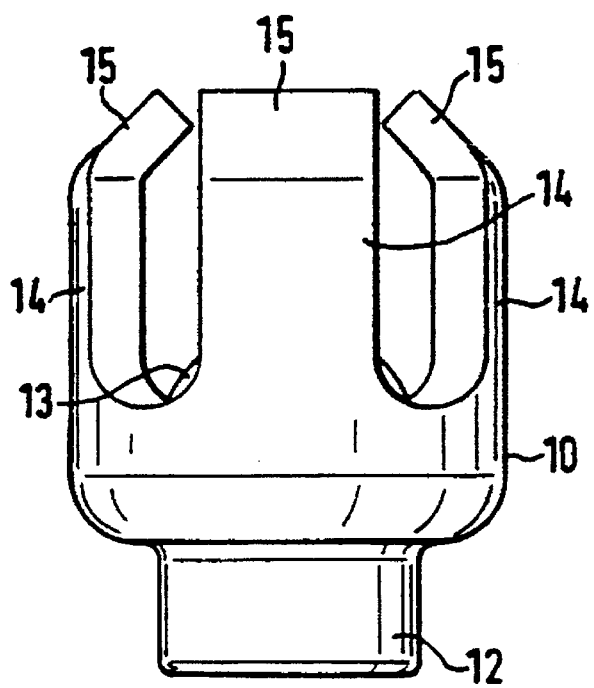
FIG. 1 shows an enlarged view of a vent valve constructed according to an embodiment of the present invention.
Figure 2:
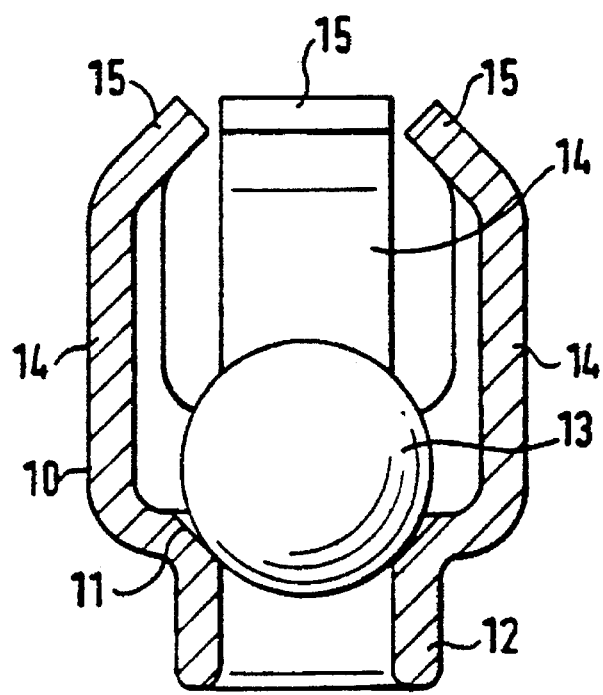
FIG. 2 is an axial section through the vent valve in FIG. 1.

The vent valve shown in the drawings is made as a one-piece metal part from an originally flat sheet, especially from a deep-drawable sheet of brass. A suitable material for example is a sheet with the material designation CuZn37F29, with a thickness of 0.5 mm. The vent valve shown in its finished state in FIGS. 1 and 2 has a pot-shaped part (10) whose bottom is provided with a valve opening (11). The valve opening (11) is surrounded by a neck (12) projecting outward from the bottom. The inside diameter of neck (12) is about two-thirds of the diameter of a ball (13) forming a sealing element. The neck (12) is pierced for installation by a bore of a valve seat of a thermostatic valve and riveted as is known for example from German Patent Document DE 81 02 817.2 U1. Valve opening (11) is frustroconical, i.e. milled at an angle of 45°.

The pot-shaped part (10) has an inside diameter which is approximately four-thirds of the outside diameter of the ball (13). Four tabs (14) abut the pot-shaped part (10), which are raised in the finished state so that they constitute an axial extension of the pot-shaped part (10). The ends (15) of the tabs (14) are bent inward in such a fashion that they form an inside cross section smaller than the diameter of ball (13). The height of the pot-shaped part (10) roughly corresponds to the radius of ball (13). The axial length of the bent tabs (14) roughly corresponds to the diameter of the ball (13), so that a free overall height inside the cage comprising the pot-shaped part (10) and the tabs (14) is approximately 1.5 times that of ball (13).

The cage can be manufactured simply and largely automatically by stamping, deep-drawing, and pressing, with the ball (13) also being inserted during these work steps. Manufacture advantageously is conducted from a sheet strip cycled successively through the individual machining stations. Initially a blank is punched out of the sheet strip, which remains connected by at least two ribs with the sheet strip. This blank comprises a middle part widened in one plane corresponding to pot-shaped part (10) and the tabs (14) abutting it and still lying in the plane. This blank, which is advantageously still connected with the sheet strip, can then be held securely by tabs (14) during the next deep-drawing steps in which the pot-shaped part (10) and the neck (12) are formed, in such fashion that reliable shaping is possible by deep drawing.

The blank is drawn for example in three deep-drawing steps to a depth which corresponds to the height of pot-shaped part (10) and approximately the height of neck (12). Then the blank is knocked out to produce the final shapes of the pot-shaped part (10) and the neck (12), recessed inward with respect to it. The neck (12), which at this time still has a bottom, is then perforated and opened. During perforation or even during the opening, the frustroconical valve seat can be pressed at the same time. The component can still be held by the tabs during these work steps.

In a next step, the ends (15) of the tabs (14), which initially still lie in the plane of the sheet strip, are tilted upward. The ball (13) is then placed in the pot-shaped part (10). The tabs (14) are then raised so that they come to rest as an extension of the pot-shaped part (10). The last step is the cutting free of the cage by severing the connections between the cage and the sheet strip still existing with the sheet strip. The vent valve is now ready for installation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of making a vent valve for a thermostatic valve of an internal combustion engine coolant circuit, comprising the steps of:

punching a blank out of sheet strip so as to comprise a middle part widened in one plane corresponding to a pot-shaped part and tabs such that the blank is connected with the sheet strip;

drawing the blank to a height which corresponds to a height of the pot-shaped part and approximately a height of a neck projecting from a bottom portion of the pot-shaped part;

knocking out the blank and final forming the pot-shaped part and the neck which is recessed radially inwardly with respect to the pot-shaped part;

perforating the neck to form an opening at the bottom portion of the pot-shaped part;

forming a frustconical seat at the opening;

tilting end portions of the tabs upwardly from a plane of the sheet strip;

placing a ball in the pot-shaped part;

raising the tabs so as to constitute an extension in an axial direction of the pot-shaped part; and severing remaining connections between the thus-formed blank and the sheet strip.

* * * * *